(12) United States Patent
Lange

(10) Patent No.: US 9,550,534 B2
(45) Date of Patent: Jan. 24, 2017

(54) MULTI-PART FRAMEWORK

(71) Applicant: GM GLOBAL TECHNOLOGY OPERATIONS LLC, Detroit, MI (US)

(72) Inventor: Marcus Lange, Pfungstaft (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/811,390

(22) Filed: Jul. 28, 2015

(65) Prior Publication Data

US 2016/0023684 A1 Jan. 28, 2016

(30) Foreign Application Priority Data

Jul. 28, 2014 (DE) .......................... 10 2014 011 263

(51) Int. Cl.
*B62D 27/02* (2006.01)
*B62D 25/06* (2006.01)
*B62D 25/02* (2006.01)

(52) U.S. Cl.
CPC .............. *B62D 27/02* (2013.01); *B62D 25/02* (2013.01); *B62D 25/06* (2013.01)

(58) Field of Classification Search
CPC ....... B62D 25/025; B62D 25/06; B62D 27/02; B62D 27/023
USPC ........................................................ 296/191
See application file for complete search history.

(56) References Cited

U.S. PATENT DOCUMENTS

| | | | | |
|---|---|---|---|---|
| 2,903,782 A | * | 9/1959 | Cowley ................... | B23D 59/02 83/676 |
| 3,444,499 A | * | 5/1969 | Lovelace ................... | G01L 1/18 257/417 |
| 5,994,678 A | * | 11/1999 | Zhao ................... | C23C 16/4586 118/722 |
| 7,121,586 B2 | | 10/2006 | McNally | |
| 8,020,927 B2 | | 9/2011 | Schmidt et al. | |
| 9,085,122 B2 | * | 7/2015 | Ohhama ................ | B32B 15/043 |
| 2004/0197571 A1 | * | 10/2004 | Hiroshige ............... | B32B 27/38 428/424.2 |
| 2014/0328614 A1 | | 11/2014 | Fleischheuer et al. | |

FOREIGN PATENT DOCUMENTS

| | | |
|---|---|---|
| CN | 101695749 A | 4/2010 |
| DE | 102005060146 A1 | 6/2007 |
| DE | 602005004188 T2 | 1/2009 |
| DE | 102011107035 A1 | 1/2013 |
| DE | 102012021820 A1 | 5/2014 |
| EP | 2546124 A2 | 1/2013 |
| JP | S58101873 A | 6/1983 |

OTHER PUBLICATIONS

German Patent Office, German Search Report for German Application No. 10 2014 011 263.2, dated Feb. 19, 2015.
Great Britain Patent Office, Great Britain Search Report for Great Britain Application No. 1511995.1, dated Jan. 7, 2016.

\* cited by examiner

*Primary Examiner* — Dennis H Pedder
(74) *Attorney, Agent, or Firm* — Lorenz & Kopf LLP

(57) ABSTRACT

A framework such as a vehicle body is disclosed and includes at least two components of materials with different heat expansion coefficients fastened to one another on an elongated overlap zone. The overlap zone on a first component is subdivided by weak points oriented in its transverse direction into portions following one another in longitudinal direction.

15 Claims, 3 Drawing Sheets

MULTI-PART FRAMEWORK

CROSS-REFERENCE TO RELATED APPLICATION

This application claims priority to German Patent Application No. 102014011263.2, filed Jul. 28, 2014, which is incorporated herein by reference in its entirety.

TECHNICAL FIELD

The present disclosure pertains to a framework of multiple components, e.g., a motor vehicle body, and more particularly to a framework having different material components which reduces thermal stresses that otherwise occur with changing temperatures between components consisting of different materials when these are connected to one another in a fixed manner at multiple points that are distant from one another.

BACKGROUND

DE 10 2011 107 035 A1 discloses a method for joining components with different heat expansion coefficients, in which the components are preheated to a temperature which is in the middle of a temperature interval in which the finished framework is to keep its shape so that the framework although being under stress at both limits of the temperature interval, but these stresses do not become so severe that they deform the framework. For a motor vehicle body this implies that since in practice the ambient temperature forms the lower limit of the temperature interval, the body during the use of the motor vehicle is constantly subjected to stress and when it is damaged during an accident yield to these stresses through abrupt deformation under certain conditions. In addition, this method requires a major expenditure of time, energy and material since the required tools for heating the components to be connected have to be made available and operated, and the time spent for joining the body is extended at least by the time needed for tempering the components.

SUMMARY

In accordance with the present disclosure, a framework of components with different heat expansion coefficients is created, which does not tend to a stress-induced deformation even with major temperature fluctuations. In particular, a framework, such as a motor vehicle body, is provided with at least two components in the form of a frame member fastened to one another on an elongated overlap zone of materials with different heat expansion coefficients on at least a first of the two components. The overlap zone is subdivided by weak points oriented in a transverse direction into sections following one another in longitudinal direction. In that the first component locally deforms at the weak points, the occurrence of stresses which globally deform the framework can be prevented. A time-consuming temperature controlling step is not necessary Creating the weak points can be integrated with little effort in the production of the first component, in particular by cutting to size, punching out, deep drawing or the like.

A fixed connection to the second component should be formed in multiple of these sections. Preferably, each of these sections should have a fixed connection for when a section remains unconnected to the second component, it and the weak points limiting it could be replaced by a single possibly wider weak point and the structure of the first component simplified in this way. The fixed connection can be of any type which immovably fixes the components locally to one another such as for example a welded, riveted, clinching or gluing connection.

In that the weak points become narrower with rising temperature and wider with decreasing temperature, they can adapt the heat expansion behavior of the first component in the overlap zone to that of the second component, so that deformation similar to the known bi-metallic effect does not occur. When the component with the higher heat expansion coefficient is selected as first component, the heat expansion of the entire framework will substantially orient itself towards the lower expansion coefficient of the second component.

According to a simple and practical configuration, the weak points are formed as slots oriented in transverse direction of the overlap zone. At least the first component should be a cutting of flat material in particular sheet metal. The overlap zone can then extend along an edge of the flat material cutting. This facilitates the first component yielding to the stress acting in the overlap zone without being irreversibly deformed by this. Obviously, the second component can also be a flat material cutting and the overlap zone can also run at the edge of this cutting.

Reversible or elastic yielding of the first component upon thermal stress can be facilitated in particular in that the slots are open towards the edge of the flat material cutting of the first component. Widening at an end of the slots that is distant from an edge contributes to spatially distributing the thermal stresses that occur in the first component and counteract the risk of the formation of stress cracks in the first component, in particular at the end of the slots that are distant from the edge. A further contribution to avoiding excessive stresses at the ends of the slots that are distant from the edge that could possibly be material damaging can be that their distance from the edge is greater than the distance of the fixed connections from the edge.

In order to avoid leakage of the framework the slots should be completely covered by the second component. In order to prevent that dirt or moisture can accumulate in the slots these can be filled out with a permanently elastic sealing compound. When the first component has the lower thermal expansion coefficient, the filling out of the slots with the sealing compound should take place at low temperature. In this way it can be ensured that the sealing compound is subjected to pressure, but not tensile loading which could result in a tearing-open of the connection of the sealing compound to the flanks of the first component limiting the slots.

According to a possible application, the two components together form a hollow profile, in the case of a motor vehicle body, in particular a body side or cross member or a sill. According to a preferred application, one of the two components is a roof panel of a vehicle body and the other one is a side beam, which extends laterally of the roof panel, in particular above a door aperture of the body. With a typical application, the first component consists of aluminum while the second component can consist of steel.

During the drying of an applied paint layer, a framework such as for example a motor vehicle body is mostly exposed to high temperatures so that in particular during the drying of the paint layer major thermal stresses can occur. Such painted frameworks form a preferred area of application of the present disclosure.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
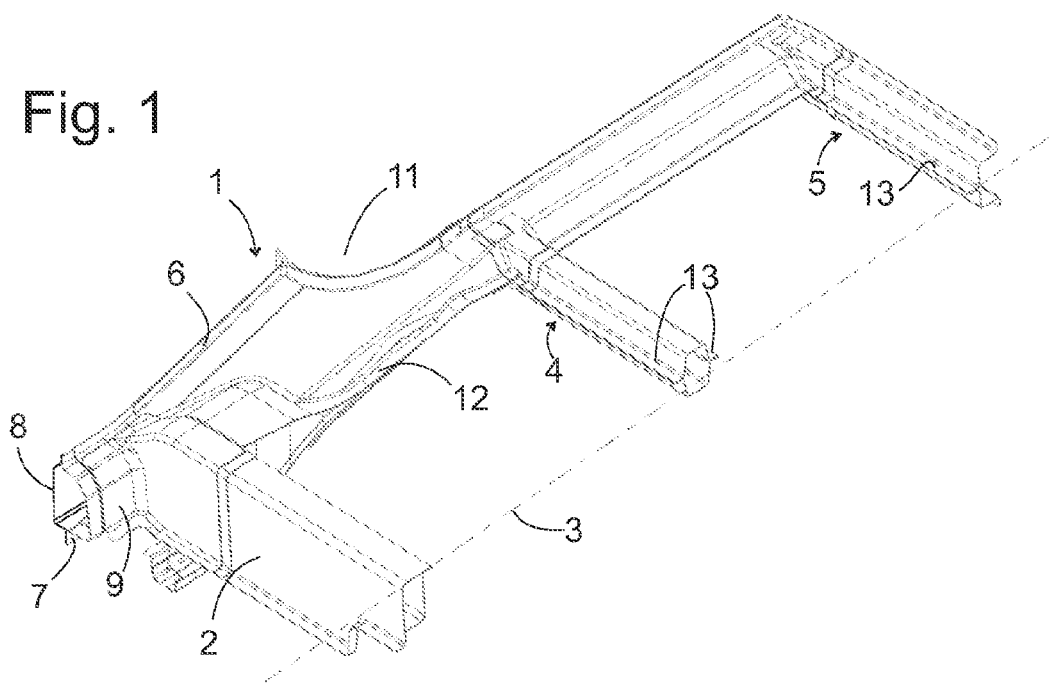
FIG. 1 is a perspective view of an extract of the frame structure of a motor vehicle body.

As a first application example of the present disclosure, FIG. 1 shows an extract from a frame structure forming a lower part of a motor vehicle body. The frame structure includes a side member 1, which substantially extends over the entire length of the vehicle body and of which merely a rear part is shown here, which extends from a heel plate 2 in the direction of the vehicle rear. The frame structure is mirror-symmetrical with respect to a symmetry plane marked in FIG. 1 by a dash-dotted line 3. The halves of the heel plate 2 extending on the other side of the symmetry plane and of cross members 4, 5 originating from the side member 1 are not shown in the figure.

The side member 1 is assembled from multiple panels, which in overlap zones extending in vehicle longitudinal direction are connected to one another. Elongated flanges formed at the edges of the panels are welded, glued or in another manner fastened to one another. Two such panels which are connected to one another in overlap zones 6, 7 and which complement one another at least at a front end of the shown portion of the side member it to form a closed hollow profile are marked with 8 and 9 respectively.

A further elongated panel 10, which in front of the heel plate 2 has an inverted hat-shaped cross section and runs below a floor panel (not shown) of the passenger cell, merges with the panels 8, 9 at the height of a rear wheel housing recess 11 and is connected to the panel 9 in an overlap zone 12. The cross members 4, 5 are each also assembled from two elongated panels which are connected to one another on overlap zones 13.

The panels which are connected to one another along the overlap zones 6, 7, 12 or 13 may have different materials, e.g., one of the panels may be steel and the other panel may be aluminum.

Figure 2:
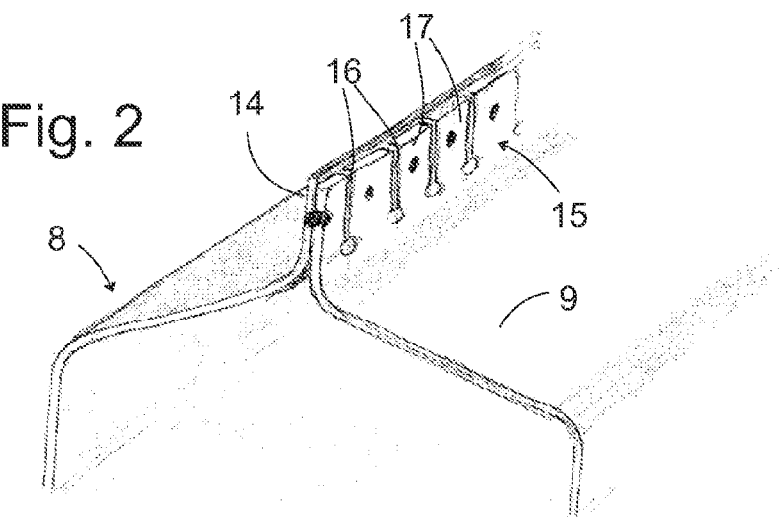
FIG. 2 is an enlarged detail from the frame structure of FIG. 1 in perspective view.

In the overlap zones, two flanges each of the two panels touch one another, as is exemplarily shown in an enlarged manner for the panels 8, 9 in FIG. 2. In order to prevent the panels which are connected to one another from distorted at high temperature, in particular when after the painting of the body the same is dried at high temperature, the flange 15 with one of the two panels, in this case the aluminum panel 9 is divided into tongue-like portions 17 by a multitude of slots 16 which are open towards the edge of the panel. Each individual portion 17 is fastened to the opposite flange 14 of the steel panel 8 by connections 18 in the form of welded spots or glued spots, rivets or the like. The heat expansion of the aluminum which is higher compared to steel results in that the slots 16 at high temperature become slightly narrower. Accordingly, stresses between the panels 8, 9, which could otherwise lead to bending or tearing-open of the connections 18 are avoided. Expansions 19 at the ends of the slots 16 that are distant from the edge facilitate the required deformation of the panel 9 and prevent that the stresses in the panel 9, in particular at the ends of the slots 16, are concentrated over a narrow space in such a manner that buckling or tearing of the panel 9 can occur there.

Figure 3:
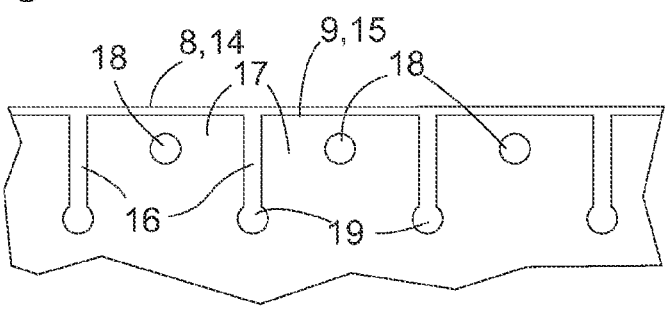
FIG. 3 shows the detail of FIG. 2 in top view.

The slots 16 are shown empty in FIGS. 2 and 3. In practice, however, they may be practically filled out with a permanently elastic sealing compound when there is the possibility of contact with corrosion-promoting substances such as precipitation water or dirt swirled up from the road. The sealing compound prevents these substances from accumulating in the slots 16 and imparts the flange 15 on its top side facing away from the flange 14, preferably with a flat surface that is difficult for substances to adhere to.

Figure 4:
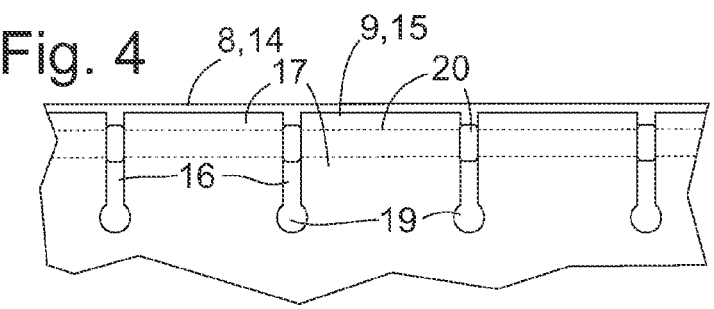
FIG. 4 is a top view analogous to FIG. 3 according to a modified configuration.

FIG. 4 shows a top view of flanges 14, 15 of the two panels 8, 9 which are connected to one another analogously to FIG. 3. The connection in this case is formed by an adhesive bead 20 that is continuously applied onto the non-slotted flange 14 of the panel 8. During the pressing-together and gluing together of the flanges 14, 15, the adhesive enters a small distance into the slots 16 of the panel 9 but is resilient enough even in the cured state so as not to obstruct a narrowing of the slots 16 at high temperature. Here, too, the slots 16 can be filled out with the sealing compound mentioned above provided they have not already been filled out by the adhesive.

Figure 5:
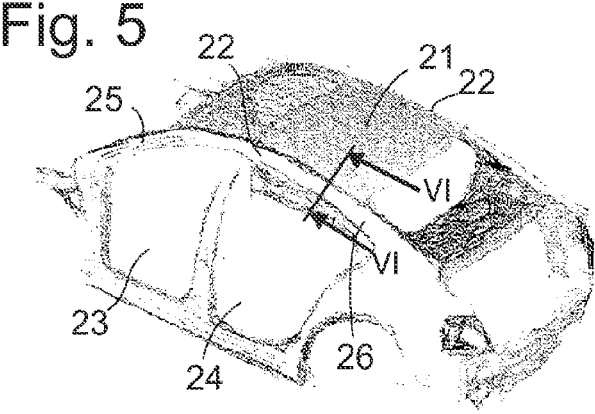
FIG. 5 shown an upper part of a motor vehicle body.
Figure 6:
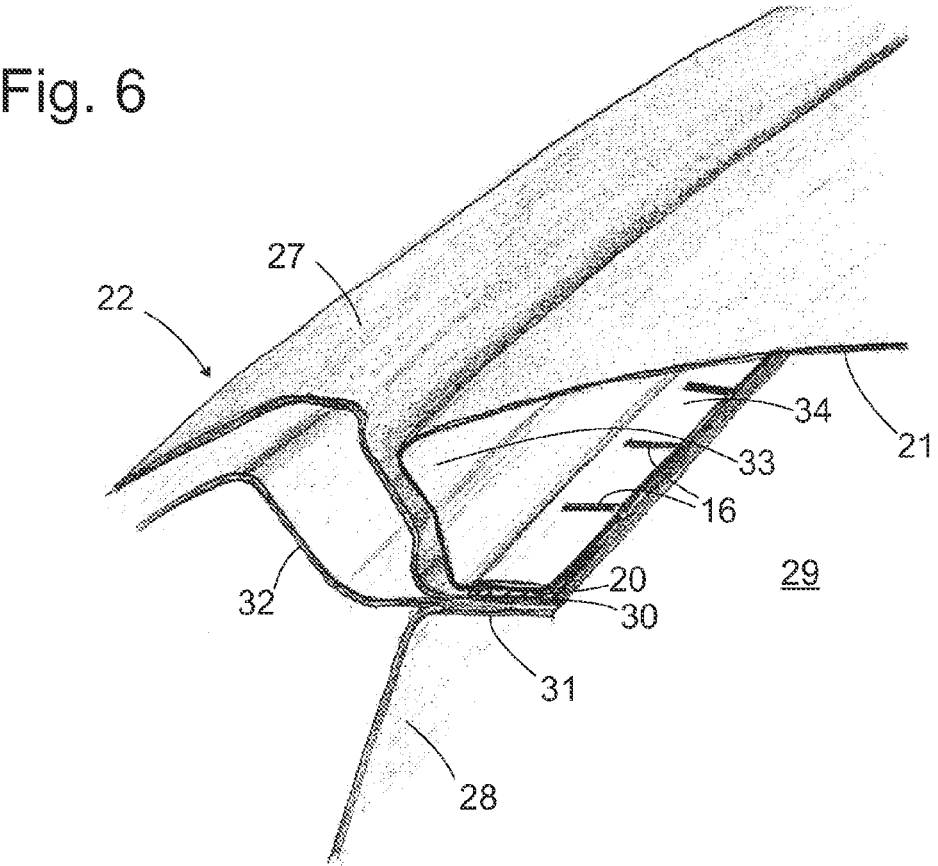
FIG. 6 is a section along the plane VI-VI from FIG. 5.

FIG. 5 shows a perspective view of a top part of a motor vehicle body. A roof panel 21 in this case is flanked by side beams 22 on both sides, which connect A pillar 25 and C-pillar 26 of the body to one another above door apertures 23, 24. FIG. 6 shows in section along the plane marked VI-VI in FIG. 5, a partial section through one of the side beams 22 and the adjacent roof panel 21. The side beam 22 is joined together from an outer panel 27, an inner panel 28, which are connected to one another via flanges 30, 31 which are elongated in vehicle longitudinal direction projecting into a roof aperture 29 that is limited on both sides by the side beams 22 and via flanges on the upper edge of the door aperture 24 which is not shown in FIG. 6. A reinforcing panel 32 extends through the hollow space limited by the outer and inner panel 27, 28 and engages between the flanges of outer and inner panel 27, 28 which are each connected to one another.

On its lateral edge, the roof panel 21 is bent C-like with an approximately upright flank 33, which is located opposite a rising flank of the outer panel 27, and an approximately horizontally oriented flange 34 following the flank 33. The flanges 30, 31 and 34 form an overlap zone in which the flange 34 of the roof panel 21 supports itself on the flanges 30, 31 of the side beam 22 and is fastened to the same by an adhesive bead 20 running in vehicle longitudinal direction analogously to the representation of FIG. 4. Here, too, the flange 34 of the roof panel 24 consisting of aluminum is subdivided in longitudinal direction by numerous slots 16 which, by getting narrower at high temperature, prevent the occurrence of deforming stresses between the roof panel 23 and the steel panels 27, 28, 32 of the side beam 22.

Figure 7:
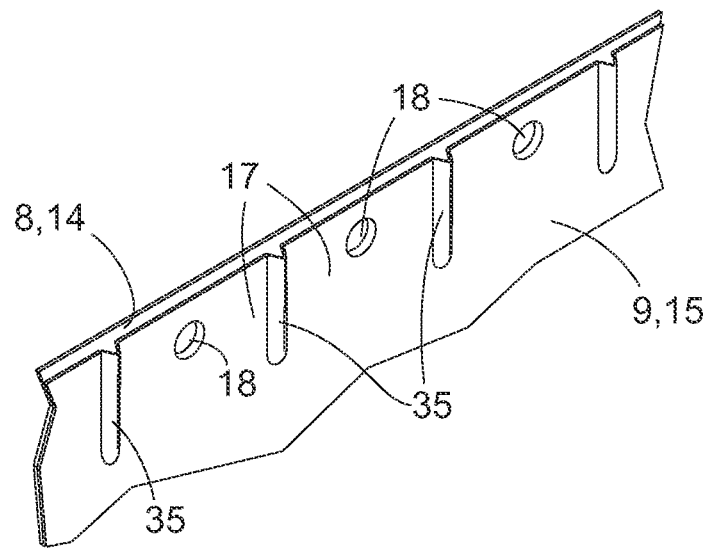
FIG. 7 shows an overlap zone between two components according to a further configuration of the present disclosure.

In a perspective view, FIG. 7 shows an extract of two flanges 14, 15 which are connected to one another, analogous to those of the FIGS. 3 and 4. While, however, in FIGS. 3 and 4 slots 16 weaken the flange 15 of the panel 9, beads 35 are stamped into the panel 9 in FIG. 7 for this purpose. When the portions 17 located between them expand more greatly at high temperature than the opposite panel 8, these beads can also absorb stresses by becoming narrower. As a further example of a possible fixed connection 18 between the panels 8 and 9, clinch connections in the portions 17 are indicated in FIG. 7.

It is to be understood that the above detailed description and the drawings represent certain exemplary configurations of the present disclosure but that they are only intended for illustration and should not be interpreted as being restrictive of the scope of the present disclosure. Various modifications of the described configurations are possible without leaving the scope of the following claims and their range of equivalents. In particular, the mentioned panels may include metals other than steel and/or aluminum, pairings of metal with composite materials such as for example "Organoplate" or pairings of composite materials among them are possible.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A framework for a vehicle body comprises a first member consisting of aluminum fastened to a second member consisting of steel on an elongated overlap zone in which the first member is subdivided by weak points oriented in a transverse direction into portions following one another in longitudinal direction, the weak points comprising slots formed in the first member, the slots have a first end opposite a second end, and the first end of each of the slots is open at an edge of the first member,
   wherein the first and second members have different heat expansion coefficients, a plurality of the portions of the first member forms a fixed connection to the second member, and a first distance between the second ends of the slots and the edge of the first member is greater than a second distance between the fixed connections and the edge of the first member.

2. The framework according to claim 1, wherein the fixed connection is a formed by at least one of a weld, rivet, clinch or glued connection.

3. The framework according to claim 1 in which each portion of the first member forms a fixed connection to the second member.

4. The framework according to claim 3, wherein the fixed connection is a formed by at least one of a weld, rivet, clinch or glued connection.

5. The framework according to claim 1, wherein a heat expansion coefficient of the first member is greater than a heat expansion coefficient of the second member.

6. The framework according to claim 1, wherein the first member comprises a flat material cutting and the overlap zone extends along an edge of the first member.

7. The framework according to claim 1, wherein the second member completely covers the weak points in the first member.

8. The framework according to claim 1, wherein the slots are filled out with a permanently elastic sealing compound.

9. The framework according to claim 1, wherein the first and second members together form a hollow profile in the vehicle body.

10. The framework according to claim 9, wherein the first and second members together form a body side member.

11. The framework according to claim 9, wherein the first and second members together form a cross member of a sill.

12. The framework according to claim 1, wherein one of the first and second members comprise a roof panel and the other a side beam flanking the roof panel.

13. The framework according to claim 1, wherein at least one of the members is painted.

14. The framework according to claim 1, wherein the weak points further comprise an expansion formed at the second ends of the slots and the expansion at the second ends of the slots has a width that is different than a width of a reminder of the slot, and the fixed connections are each defined on a respective one of the plurality of portions so as to be spaced a distance apart from a respective one of the slots.

15. A framework for a vehicle body comprises a first member consisting of aluminum fastened to a second member consisting of steel on an elongated overlap zone in which the first member is subdivided by weak points oriented in a transverse direction into portions following one another in longitudinal direction, the weak points comprising beads stamped in the first member so as to extend outwardly from a surface of the first member, the beads have a first end opposite a second end, and the first end of each of the beads is at an edge of the first member,
   wherein the first and second members have different heat expansion coefficients, a plurality of the portions of the first member forms a fixed connection to the second member, and a first distance between the second ends of the beads and the edge of the first member is greater than a second distance between the fixed connections and the edge of the first member.

* * * * *